United States Patent [19]

Furukawa

[11] Patent Number: 4,797,688

[45] Date of Patent: Jan. 10, 1989

[54] MULTI-NOZZLE INK-JET PRINTER

[75] Inventor: Tatsuya Furukawa, Yokohama, Japan

[73] Assignee: Ricoh Company, Ltd., Tokyo, Japan

[21] Appl. No.: 915,760

[22] Filed: Oct. 6, 1986

[30] Foreign Application Priority Data

Oct. 4, 1985 [JP] Japan ................................ 60-221413

[51] Int. Cl.$^4$ ............................................ G01D 15/18

[52] U.S. Cl. .................................................... 346/75

[58] Field of Search ........................................ 346/75

[56] References Cited

U.S. PATENT DOCUMENTS 4,535,339 8/1985 Horike et al. ........................ 346/75

*Primary Examiner*—E. A. Goldberg
*Assistant Examiner*—Gerald E. Preston
*Attorney, Agent, or Firm*—Oblon, Fisher, Spivak, McClelland & Maier

[57] ABSTRACT

A multi-nozzle ink-jet printer includes a printhead for ejecting a plurality of ink droplets substantially at the same time in parallel, a charging electrode for charging ink droplets selectively, a pair of deflector electrodes for forming a deflecting electric field therebetween and a gutter for collecting those ink droplets which have not been sufficiently deflected to be used for printing. The gutter may be used as a detector electrode, in which case the gutter is connected to a velocity measuring circuit for measuring an average velocity of ink droplets. One or more separate detector electrodes may be provided for detecting charge carried by the ink droplets for measuring an average velocity of the ink droplets.

40 Claims, 2 Drawing Sheets

Fig.4a-1
Fig.4a-n
Fig.4b-1
Fig.4b-2
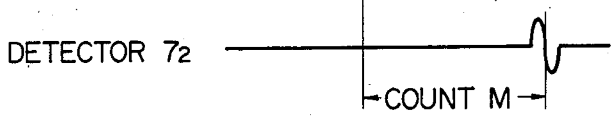
Fig.4c
Fig. 5
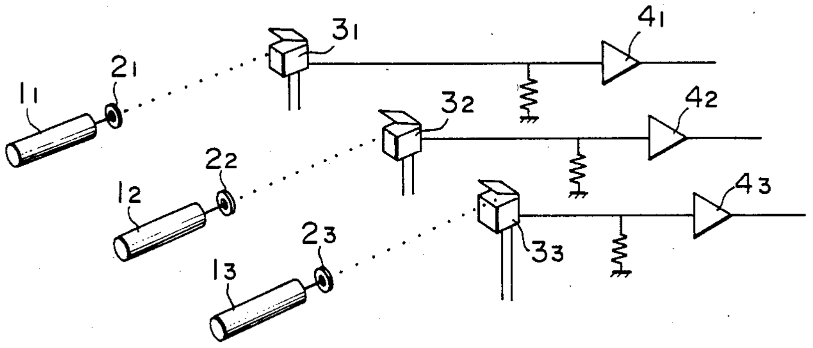
Fig.6
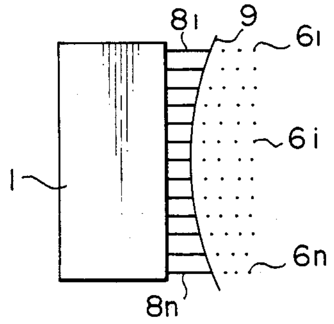

MULTI-NOZZLE INK-JET PRINTER

BACKGROUND OF THE INVENTION

1. Field of the Invention

This invention generally relates to an ink-jet printer of the type for charging ink droplets selectively and deflecting charged ink droplets, and, in particular, to a multi-nozzle ink-jet printer including a plurality of ink ejecting ports.

2. Description of the Prior Art

An ink-jet printer is well known in the art and there are several types of ink-jet printers. One of the types which is widely used is of the type in which ink droplets are ejected out of an ink nozzle, selectively charged varyingly in accordance with an image signal and deflected by a pair of deflecting electrodes between which a deflecting electric field is formed. This type of ink-jet printer may be provided with a multi-nozzle head including a plurality of ink-discharging nozzles arranged in the form of a linear array. Such a multi-nozzle ink-jet printer is advantageous because a plurality of ink droplets are ejected at the same time in parallel so that printing speed can be increased.

However, since the diameter of an ink nozzle from which ink droplets are ejected is relatively small in size, the ink ejecting performance could differ from one nozzle to another significantly. Thus, ink droplets ejected from different nozzles could differ in velocity, which is disadvantageous because there is only obtained a printed image with distortion. Accordingly, it is important that the velocity of flying ink droplet is measured and controlled such that the ink droplets flying in parallel should have substantially the same velocity so as to enhance the quality of printed image.

SUMMARY OF THE INVENTION

In accordance with the principle of the present invention, there is provided an ink-jet printer including means for ejecting a plurality of ink droplets in parallel, measuring means for measuring an average velocity of at least some of the ink droplets ejected from said ejected means substantially at the same time, and control means for controlling the condition of ejecting said plurality of ink droplets in accordance with the average velocity measured. Preferably, the ejecting condition to be controlled is to control the level of an ink pressure applied to the ink supplied to the ejecting means. The printer also includes charging means for charging each of said plurality of ink droplets selectively and collecting means for collecting the ink droplets not used for printing. In one embodiment, this collecting means is used as part of the velocity measuring means.

It is therefore a primary object of the present invention to obviate the disadvantages of the prior art as described above and to provide a novel multi-nozzle ink-jet printer capable of obtaining a printed image of high quality.

Another object of the present invention is to provide a multi-nozzle ink-jet printer having a feed-back loop for controlling the velocity of each of the flying ink droplets to be uniform as much as possible.

A further object of the present invention is to provide an ink-jet printer consistent, reliable and fast in operation.

Other objects, advantages and novel features of the present invention will become apparent from the following detailed description of the invention when considered in conjunction with the accompanying drawings.

Figure 1:
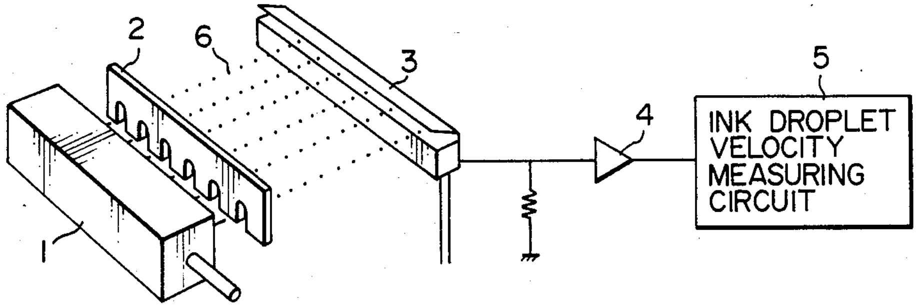
FIG. 1 is a schematic illustration showing a multi-nozzle ink-jet printer constructed in accordance with one embodiment of the present invention.
Figure 1:
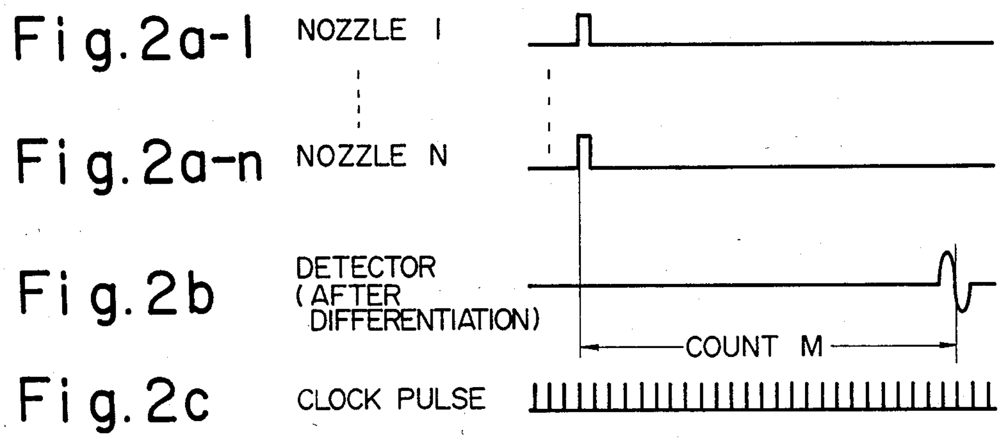
Figure 3A:
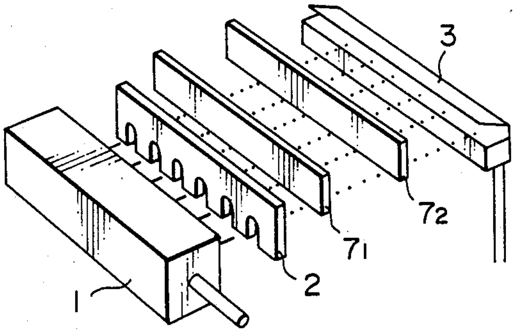
Figure 3B:
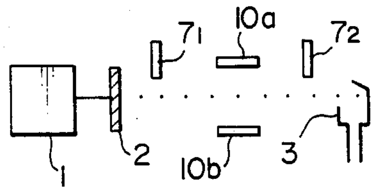

FIGS. **2*a*-1 through 2*a*-n, 2*b* and 2*c* are timing charts which are useful for understanding the operation of the structure shown in FIG. 1**;

FIG. **3*a*** is a schematic illustration showing in perspective a multi-nozzle ink-jet printer constructed in accordance with another embodiment of the present invention;

FIG. **3*b* is a schematic illustration showing in side elevation the structure shown in FIG. 3*b***;

FIGS. **4*a*-1 through 4*a*-n, 4*b*-1, 4*b*-2 and 4*c* are timing charts which are useful for understanding the operation of the structure shown in FIGS. 3*a* and 3*b*; and FIGS. 5 and 6** are schematic illustrations showing two alternative embodiments of the present invention.

DESCRIPTION OF THE PREFERRED EMBODIMENTS

Referring now to FIG. 1, there is schematically shown a multi-nozzle ink-jet printer constructed in accordance with one embodiment of the present invention. As shown, the printer includes a multi-nozzle printhead 1 provided with a plurality of nozzles (not shown) for ejecting a plurality of ink droplets at the same time in parallel. A charging electrode 2 is disposed in front of the printhead 1 and the illustrated charging electrode 2 is provided with a plurality of notches through which simultaneously ejected ink droplets are passed, thereby becoming electrically charged. A gutter 3 is located away from the printhead 1 and it is elongated transversely so as to receive a plurality of ink droplets flying in parallel. Although not shown for the sake of brevity, it should be noted that a pair of deflecting upper and lower electrodes is disposed between the charging electrode 2 and the gutter 3. This pair of deflecting electrodes forms a deflecting electric field in a direction perpendicular to the direction of advancement of the ink droplets, so that an ink droplet is caused to shift in position vertically over an amount depending on the amount of charge carried thereon.

In the illustrated embodiment, the gutter 3 is comprised of an electrically conductive material, and it is connected to a velocity measuring circuit 5 through an amplifier 4 and also to ground through a resistor. It should also be noted that, although not shown, there is also provided a recording medium to which ink droplets 6 are selectively applied to define a printed image thereon. On the other hand, those ink droplets which are not to be used for printing are very little charged or uncharged and thus these ink droplets are not significantly deflected. Accordingly, these ink droplets having insufficient charge are collected into the gutter 3 for reuse. Thus, although not shown specifically, in preferred embodiment, the gutter 3 is in fluidic communication with the printhead 1 through an ink reservoir (not shown), a pump (not shown) and a filter (not shown). Therefore, the ink collected by the gutter 3 is recirculated and pumped into the printhead 1 for reuse.

In the case of the ink-jet printer shown in FIG. 1, a plurality of ink droplets 6 are ejected at the same time in parallel and it is important that all of the ink droplets 6 be close to a desired velocity as much as possible. In the present embodiment, the gutter 3 serves not only as a collector for collecting unused ink droplets, but also as a common detector for detecting the arrival of the insufficiently deflected ink droplets. Now, the operation of measuring the average velocity of flying ink droplets 6 will be described also with reference to FIGS. 2*a*-1 through 2*a*-n, 2*b* and 2*c*. When the ink under pressure is supplied to the printhead 1, ink droplets 6 are ejected in parallel and they pass through the charging electrode 2 and finally become collected into the gutter. When a charge pulse is applied to each of the simultaneously ejected ink droplets 6 as indicated by FIGS. 2*a*-1 through 2*a*-n, these ink droplets 6 are charged relatively weakly, and, thus, the ink droplets 6 do not become deflected when passing through the deflecting electric field, so that these weakly charged droplets 6 may still be collected into the gutter 3.

Since the ink droplets 6 bear some charge, when they are collected into the gutter 3, a detection signal as shown in FIG. 2*b* is detected by the gutter 3 and it is supplied to the velocity measuring circuit 5 through the amplifier 4. In this case, the maximum level of charge is detected, so that the velocities of ink droplets can be averaged out. Since the time when the charging pulses are simultaneously applied to the charging electrode 2 is known, and the detection pulse indicated by FIG. 2*b* is detected, by counting the clock pulses between these two points (m count in the present example), the average velocity of the ink droplets 6 can be measured quite easily. The measuring circuit 5 also includes a memory which stores a reference count, and, thus if the measured count M is compared with this reference count and the driving condition of the motor for supplying the ink under pressure to the printhead 1 in accordance with a difference between these counts so as to make this difference substantially equal to zero, the average velocity of the ink droplets 6 can be maintained at constant at all times.

FIGS. 3*a* and 3*b* show a multi-nozzle ink-jet printer constructed in accordance with another embodiment of the present invention. It is to be noted that this embodiment is similar to the previously described embodiment shown in FIG. 1, so that like numerals indicate like elements. The present embodiment differs from the previous embodiment of FIG. 1 in that a pair of elongated detector electrodes $7_1$ and $7_2$ is provided as extending in the transverse direction above the trajectory path of the ink droplets. The detector electrodes $7_1$ and $7_2$ are spaced apart from each other over a predetermined distance and disposed in parallel extending in the direction perpendicular to the trajectory of the ink droplets 6. In the present case also, when charged ink droplets pass by, a detection signal is produced by charge induction. As a modification, one of the detector electrodes $7_1$ or $7_2$ may be discared if the timing of applying charging pulses is utilized as a starting point for counting clock signals. This is a non-contact type embodiment because none of the detector electrodes $7_1$ and $7_2$ is expected to be wet by the ink used, in contrast to the previous embodiment, in which the gutter 3 is always wet with the ink. Also shown in FIG. 3*b* is a pair of deflecting electrodes 10*a* and 10*b*.

FIG. 5 shows a further embodiment of the present invention, in which a plurality of individual printheads $1_1$ through $1_3$, a plurality of individual charging rings $2_1$ through $2_3$ and a plurality of gutters $3_1$ through $3_3$ are provided. The operation of this embodiment should be easily understood as an analogy of that described with reference to FIG. 1. In the present case, since the gutters $3_1$ through $3_3$ provide separate detection signals, they must be supplied to a processor, where an average of the separate detection signals is calculated and used in controlling the driving condition of the pump so as to maintain the velocity of the ink droplets 6 at desired level.

When the timing of charging the ink droplets 6 is used as the start point, a scatter in the location of forming ink droplets from an ink column at the outlet of the printhead 1 significantly affects the accuracy of the velocity measurement. For example, in the case of a single printhead provided with a plurality of nozzles, the pressure distribution due to a vibrator is arcuate-shaped, so that the ink column at the center tends to be converted into ink droplets relatively close to the printhead; on the other hand, the ink column at each edge tends to extend far away from the printhead 1 until it is broken into ink droplets. Thus, when measuring the velocity of flying ink droplets, it is not necessary to charge all of the ink droplets, but at least one at the center and at least one at the edge may be preferably selected.

As shown in FIG. 6, when a plurality of ink droplets are to be ejected from the single printhead 1 provided with a plurality of nozzles, an ink column $8_1$ or $8_n$ tends to extend longer compared with those at the center. As indicated by the dotted line, the ink column 8 extending out of the printhead 1 becomes broken and coverted into ink droplets at a point intersecting with an arcuate line 9. Thus, the ink droplets 6 are produced closer to the printhead 1 at the central region; whereas, the ink droplets 6 are produced at a location away from the printhead 1 at the edge portion. Thus, the velocity difference among the flying ink droplets is the largest between those at the center and those at the edge. In such a case, it is preferable to use one or more of central ink droplets $6_i$ and one or more of edge ink droplets $6_1$ and/or $6_n$ for velocity measurement. In other words, only these selected ink droplets are charged to be used for velocity measurement.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention. Therefore, the above description and illustration should not be construed as limiting the scope of the invention, which is defined by the appended claims.

What is claimed is:

1. A multi-nozzle ink-jet printer comprising:

ejecting means for ejecting a plurality of ink droplets substantially at the same time in parallel in a predetermined direction;

charging means for charging said plurality of ink droplets selectively;

means for producing a deflecting electric field through which said plurality of ink droplets fly through, thereby causing said ink droplets to be deflected depending on an amount of charge carried by each of said ink droplets;

collecting means located at a predetermined distance away from said ejecting means for collecting those of said ink droplets which have not been deflected over a predetermined amount, said collecting means being comprised of an electrically conductive material at least partly for producing a detection signal upon detection of said ink droplets; and measuring means electrically connected to said collecting means for measuring an average velocity of said plurality of ink droplets based on said detection signal.

2. The printer of claim 1 wherein said measuring means counts a number of clock pulses from a time when said charging means is activated to a time when said detection signal is received from said collecting means.

3. The printer of claim 2 wherein said measuring means compares said count with a reference value and controls a pressure of ink to be supplied to said ejecting means in accordance with a difference between said count and said reference value.

4. The printer of claim 1 wherein said ejecting means includes a single printhead provided with a plurality of nozzles, whereby each of said plurality of nozzles ejects one of said plurality of ink droplets.

5. The printer of claim 4 wherein said charging means charges said ink droplets ejected from at least a nozzle in a central region and another nozzle in an end region.

6. The printer of claim 1 wherein said ejecting means includes a plurality of separate printheads each provided with a nozzle hole for ejecting one of said plurality of ink droplets.

7. A multi-nozzle ink-jet printer comprising:

ejecting means for ejecting a plurality of ink droplets substantially at the same time in parallel in a predetermined direction;

charging means for charging said plurality of ink droplets selectively;

means for producing a deflecting electric field through which said plurality of ink droplets fly through, thereby causing said ink droplets to be deflected depending on an amount of charge carried by each of said ink droplets;

collecting means located at a predetermined distance away from said ejecting means for collecting those of said ink droplets which have not been deflected over a predetermined amount; and measuring means for measuring an average velocity of said plurality of ink droplets, said measuring means including at least one detector electrode located between said charging means and said collecting means for detecting charge carried by any of said ink droplets by charge induction during its flight from said ejecting means to said collecting means.

8. The printer of claim 7 wherein said measuring means includes a pair of detector electrodes spaced apart from each other over a predetermined distance.

9. A multi-nozzle ink-jet printer comprising:

ejecting means for ejecting a plurality of ink droplets substantially at the same time in parallel in a predetermined direction;

charging means located at a predetermined distance from said ejecting means for charging said plurality of ink droplets selectively;

detecting means located at another predetermined distance from said ejecting means for detecting ink droplets charged by said charging means;

measuring means for measuring an average velocity of said plurality of ink droplets which have been ejected by said ejecting means substantially at the same time by counting a time period from a point in time when said plurality of ink droplets have been selectively charged by said charging means to a point in time when said ink droplets have been detected by said detecting means;

comparing means for comparing said averaged velocity measured by said measuring means with a predetermined velocity; and controlling means for controlling an operation of said ejecting means so as to bring said average velocity in agreement with said predetermined velocity in accordance with an output from said comparing means.

10. The printer of claim 9 wherein said detecting means is integral with collecting means located at a further predetermined distance away from said ejecting means for collecting those of said ink droplets which have not been deflected over a predetermined amount.

11. The printer of claim 9 wherein said detecting means is comprised of an electrically conductive material at least partly for producing a detection signal upon detection of said ink droplets.

12. The printer of claim 9 wherein said measuring means counts a number of clock pulses from a time when said charging means is activated to a time when a detection signal is received from said detecting means.

13. The printer of claim 9 wherein said ejecting means includes a single printhead provided with a plurality of nozzles, whereby each of said plurality of nozzles ejects one of said plurality of ink droplets.

14. The printer of claim 9 wherein said ejecting means includes a plurality of separate printheads each provided with a nozzle hole for ejecting one of said plurality of ink droplets.

15. The printer of claim 9 wherein said measuring means measures said average velocity by simultaneously charging at least a fastest ink droplet and a slowest ink droplet among said plurality of ink droplets ejected substantially at the same time from said ejecting means.

16. A multi-nozzle ink-jet printer comprising:

ejecting means for ejecting a plurality of ink droplets substantially at the same time in parallel in a predetermined direction;

charging means located at a predetermined distance from said ejecting means for charging said plurality of ink droplets selectively;

detecting means located at another predetermined distance from said ejecting means for detecting ink droplets which have been charged by said charging means;

measuring means for measuring an average velocity of said plurality of ink droplets by counting a time period from a time when said ink droplets have been charged at the same time by said charging means to a time when said detecting means has detected a maximum charge amount of the ink droplets charged by said charging means;

comparing means for comparing said averaged velocity measured by said measuring means with a predetermined velocity; and controlling means for controlling an operation of said ejecting means so as to bring said average velocity in agreement with said predetermined velocity in accordance with an output from said comparing means.

17. The printer of claim 16 wherein said detecting means is integral with collecting means located at a further predetermined distance away from said ejecting means for collecting those of said ink droplets which have not been deflected over a predetermined amount.

18. The printer of claim 16 wherein said detecting means is comprised of an electrically conductive material at least partly for producing a detection signal upon detection of said ink droplets.

19. The printer of claim 16 wherein said measuring means counts a number of clock pulses from a time when said charging means is activated to a time when a detection signal is received from said detecting means.

20. The printer of claim 16 wherein said ejecting means includes a single printhead provided with a plurality of nozzles, whereby each of said plurality of nozzles ejects one of said plurality of ink droplets.

21. The printer of claim 16 wherein said ejecting means includes a plurality of separate printheads each provided with a nozzle hole for ejecting one of said plurality of ink droplets.

22. The printer of claim 16 wherein said measuring means measures said average velocity by simultaneously charging at least a fastest ink droplet and a slowest ink droplet among said plurality of ink droplets ejected substantially at the same time from said ejecting means.

23. A multi-nozzle ink-jet printer comprising:

ejecting means for ejecting a plurality of ink droplets substantially at the same time in parallel in a predetermined direction;

charging means located at a predetermined distance from said ejecting means for charging said plurality of ink droplets selectively;

detecting means located at another predetermined distance from said ejecting means for detecting said ink droplets, said detecting means includes a non-contact detector for detecting said ink droplets without physical contact therewith;

measuring means for measuring an average velocity of said plurality of ink droplets by counting a time period from a time when said ink droplets have been charged at the same time by said charging means to a time when said detecting means has detected a maximum charge amount of the ink droplets charged by said charging means;

comparing means for comparing said averaged velocity measured by said measuring means with a predetermined velocity; and controlling means for controlling an operation of said ejecting means so as to bring said average velocity in agreement with said predetermined velocity in accordance with an output from said comparing means.

24. The printer of claim 23 wherein said detecting means is comprised of an electrically conductive material at least partly for producing a detection signal upon detection of said ink droplets.

25. The printer of claim 23 wherein said measuring means counts a number of clock pulses from a time when said charging means is activated to a time when a detection signal is received from said detecting means.

26. The printer of claim 23 wherein said ejecting means includes a single printhead provided with a plurality of nozzles, whereby each of said plurality of nozzles ejects one of said plurality of ink droplets.

27. The printer of claim 23 wherein said ejecting means includes a plurality of separate printheads each provided with a nozzle hole for ejecting one of said plurality of ink droplets.

28. The printer of claim 23 wherein said measuring means measures said average velocity by simultaneously charging at least a fastest ink droplet and a slowest ink droplet among said plurality of ink droplets ejected substantially at the same time from said ejecting means.

29. The multi-nozzle ink-jet printer comprising:

ejecting means including a plurality of nozzles for ejecting a plurality of ink droplets one for each substantially at the same time in parallel in a predetermined direction;

charging means located at a predetermined distance from said ejecting means for charging each of said plurality of ink droplets selectively;

detecting means located at another predetermined distance from said ejecting means, said detecting means including a plurality of detectors for detecting each of ink droplets charged by said charging means;

measuring means for measuring an average velocity of said plurality of ink droplets by counting a time period between a time when each of said ink droplets has been charged by said charging means and time when each of said ink droplets has been detected by a corresponding one of said plurality of detectors;

comparing means for comparing said averaged velocity measured by said measuring means with a predetermined velocity; and controlling means for controlling an operation of said ejecting means so as to bring said average velocity in agreement with said predetermined velocity in accordance with an output from said comparing means.

30. The printer of claim 29 wherein said detecting means is comprised of an electrically conductive material at least partly for producing a detection signal upon detection of said ink droplets.

31. The printer of claim 29 wherein said measuring means counts a number of clock pulses from a time when said charging means is activated to a time when a detection signal is received from said detecting means.

32. The printer of claim 29 wherein said ejecting means includes a single printhead provided with a plurality of nozzles, whereby each of said plurality of nozzles ejects one of said plurality of ink droplets.

33. The printer of claim 29 wherein said ejecting means includes a plurality of separate printheads each provided with a nozzle hole for ejecting one of said plurality of ink droplets.

34. The printer of claim 29 wherein said measuring means measures said average velocity by simultaneously charging at least a fastest ink droplet and a slowest ink droplet among said plurality of ink droplets ejected substantially at the same time from said ejecting means.

35. A multi-nozzle ink-jet printer comprising:

ejecting means for ejecting a plurality of ink droplets substantially at the same time in parallel in a predetermined direction;

charging means located at a predetermined distance from said ejecting means for charging said plurality of ink droplets selectively;

detecting means for detecting ink droplets, said detecting means including a pair of non-contact type detectors for detecting ink droplets which are located at different locations from said ejecting means;

measuring means for measuring an average velocity of said plurality of ink droplets by counting a time period between a time when a maximum charge amount has been detected by one of said pair of detectors and a time when a maximum charge amount has been detected by the other of said pair of detectors;

comparing means for comparing said averaged velocity measured by said measuring means with a predetermined velocity; and controlling means for controlling an operation of said ejecting means so as to bring said average velocity in agreement with said predetermined velocity in accordance with an output from said comparing means.

36. The printer of claim 35 wherein said detecting means is comprised of an electrically conductive material at least partly for producing a detection signal upon detection of said ink droplets.

37. The printer of claim 35 wherein said measuring means counts a number of clock pulses from a time when said charging means is activated to a time when a detection signal is received from said detecting means.

38. The printer of claim 35 wherein said ejecting means includes a single printhead provided with a plurality of nozzles, whereby each of said plurality of nozzles ejects one of said plurality of ink droplets.

39. The printer of claim 35 wherein said ejecting means includes a plurality of separate printheads each provided with a nozzle hole for ejecting one of said plurality of ink droplets.

40. The printer of claim 35 wherein said measuring means measures said average velocity by simultaneously charging at least a fastest ink droplet and a slowest ink droplet among said plurality of ink droplets ejected substantially at the same time from said ejecting means.

* * * * *